United States Patent [19]

Ozeki

[11] Patent Number: 4,817,937
[45] Date of Patent: Apr. 4, 1989

[54] PROPULSION APPARATUS FOR A MODEL OF A FLYING OBJECT

[75] Inventor: Jiro Ozeki, Tokyo, Japan
[73] Assignee: Slidex Corporation, Tokyo, Japan
[21] Appl. No.: 72,054
[22] Filed: Jul. 10, 1987

Related U.S. Application Data

[63] Continuation-in-part of Ser. No. 743,156, Jun. 10, 1985, abandoned.

[51] Int. Cl.$^4$ ............................................. A63H 13/20
[52] U.S. Cl. ................................ 272/31 R; 272/31 A; 446/30
[58] Field of Search ................. 272/31 R, 31 A, 31 B; 446/30, 31, 32, 60, 217, 57, 59

[56] References Cited

U.S. PATENT DOCUMENTS

| | | | |
|---|---|---|---|
| 1,514,602 | 11/1924 | Charland | 272/31 A |
| 1,549,073 | 8/1925 | Dwyer | 446/60 |
| 1,772,922 | 7/1929 | Johnson . | |
| 2,222,677 | 11/1940 | Main | 446/30 |
| 2,253,661 | 8/1941 | Teuschler | 446/60 |
| 2,395,530 | 2/1946 | Barr | 446/32 |
| 2,643,126 | 6/1953 | Kelly | 446/30 X |
| 3,107,452 | 10/1963 | Berger | 272/31 A X |
| 3,907,285 | 9/1975 | Lettieri | 272/31 A |

FOREIGN PATENT DOCUMENTS

| | | | |
|---|---|---|---|
| 468076 | 9/1946 | Belgium . | |
| 492487 | 2/1936 | Fed. Rep. of Germany | 446/30 |
| 3203247 | 9/1983 | Fed. Rep. of Germany . | |
| 339309 | 12/1930 | United Kingdom | 446/217 |
| 639597 | 6/1950 | United Kingdom | 446/60 |
| 1021568 | 3/1966 | United Kingdom . | |

Primary Examiner—Mickey Yu
Attorney, Agent, or Firm—Fleit, Jacobson, Cohn & Price

[57] ABSTRACT

The present invention includes an apparatus for displaying a model of a flying object in a flying condition. By the propulsion of powerless models of flying objects through a circular path under an external power source, the aerodynamic characteristics of the model of the flying object cause the model to be lifted into a flying condition. The apparatus is useful for observing the flight stability of a model of a flying object and as a promotional display for models of flying objects. A driving device is used to rotate the model through a flight path. A transparent hanging line connects the model to the propulsion device.

6 Claims, 17 Drawing Sheets

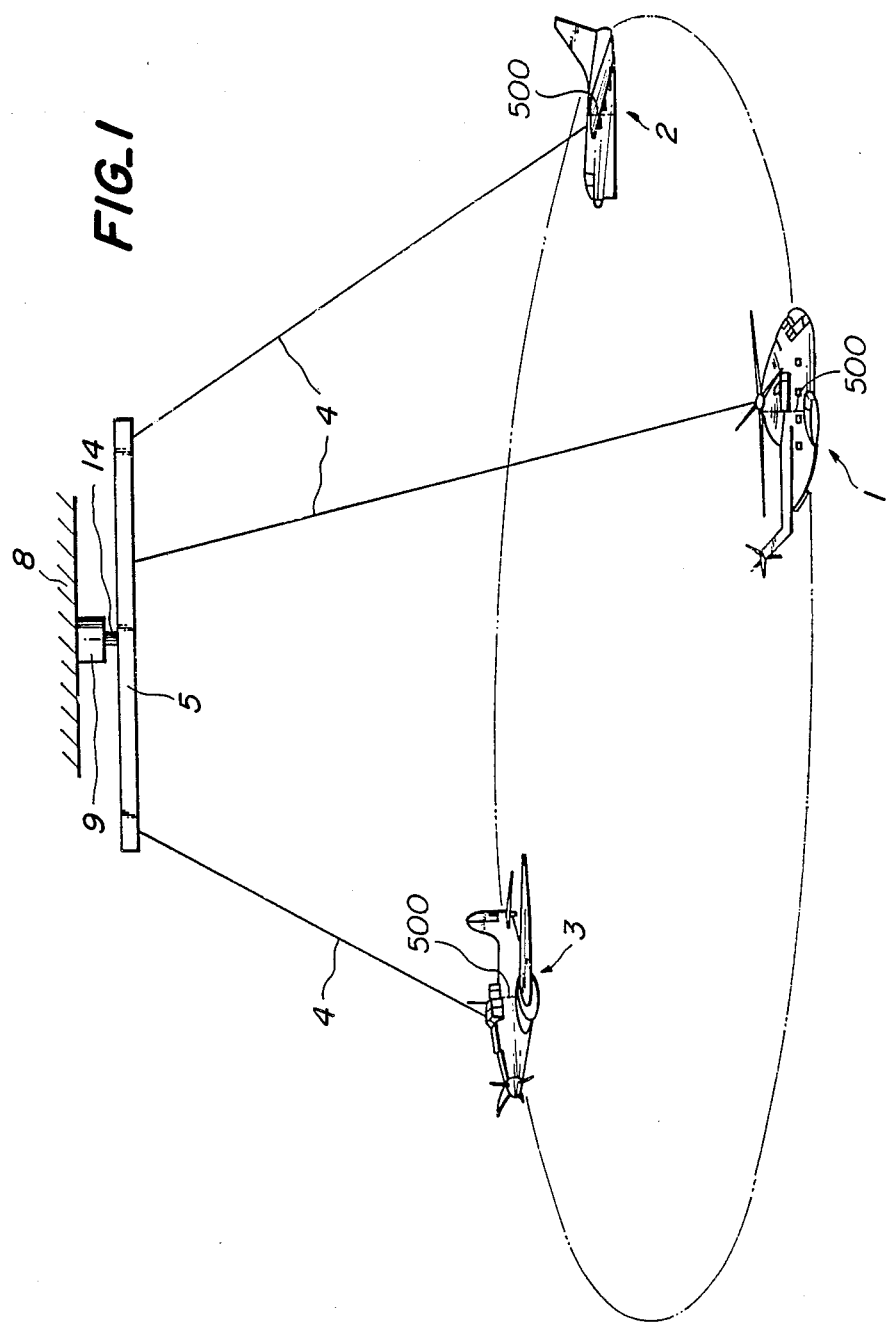

FIG_2
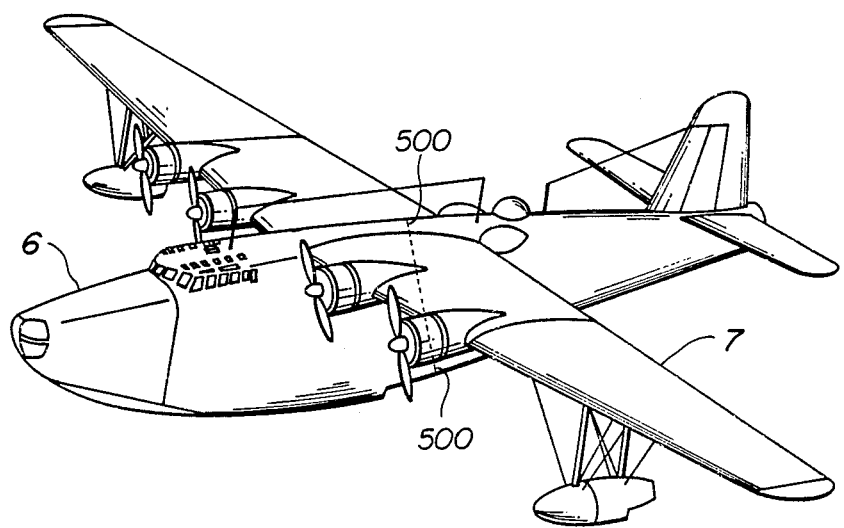

FIG_3
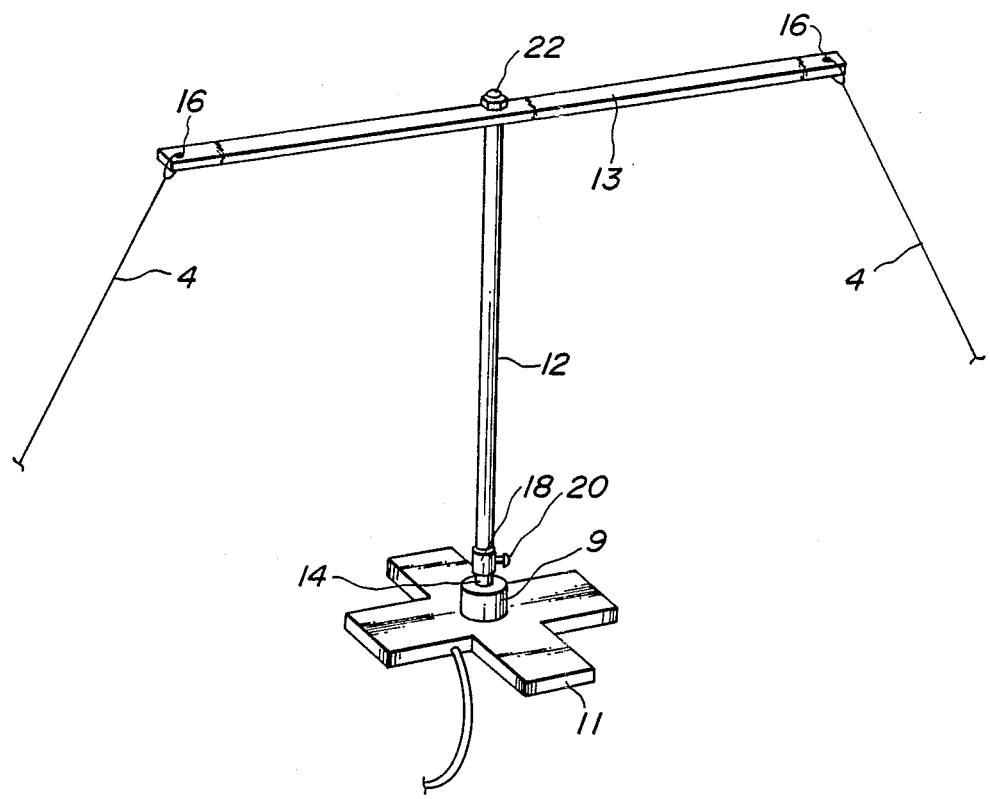
FIG_4
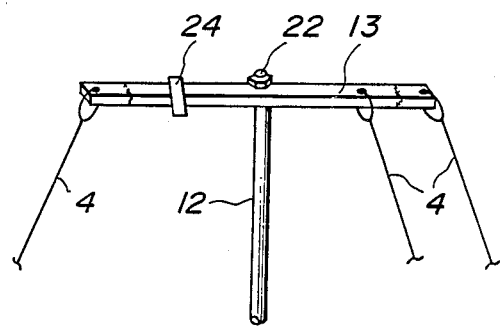

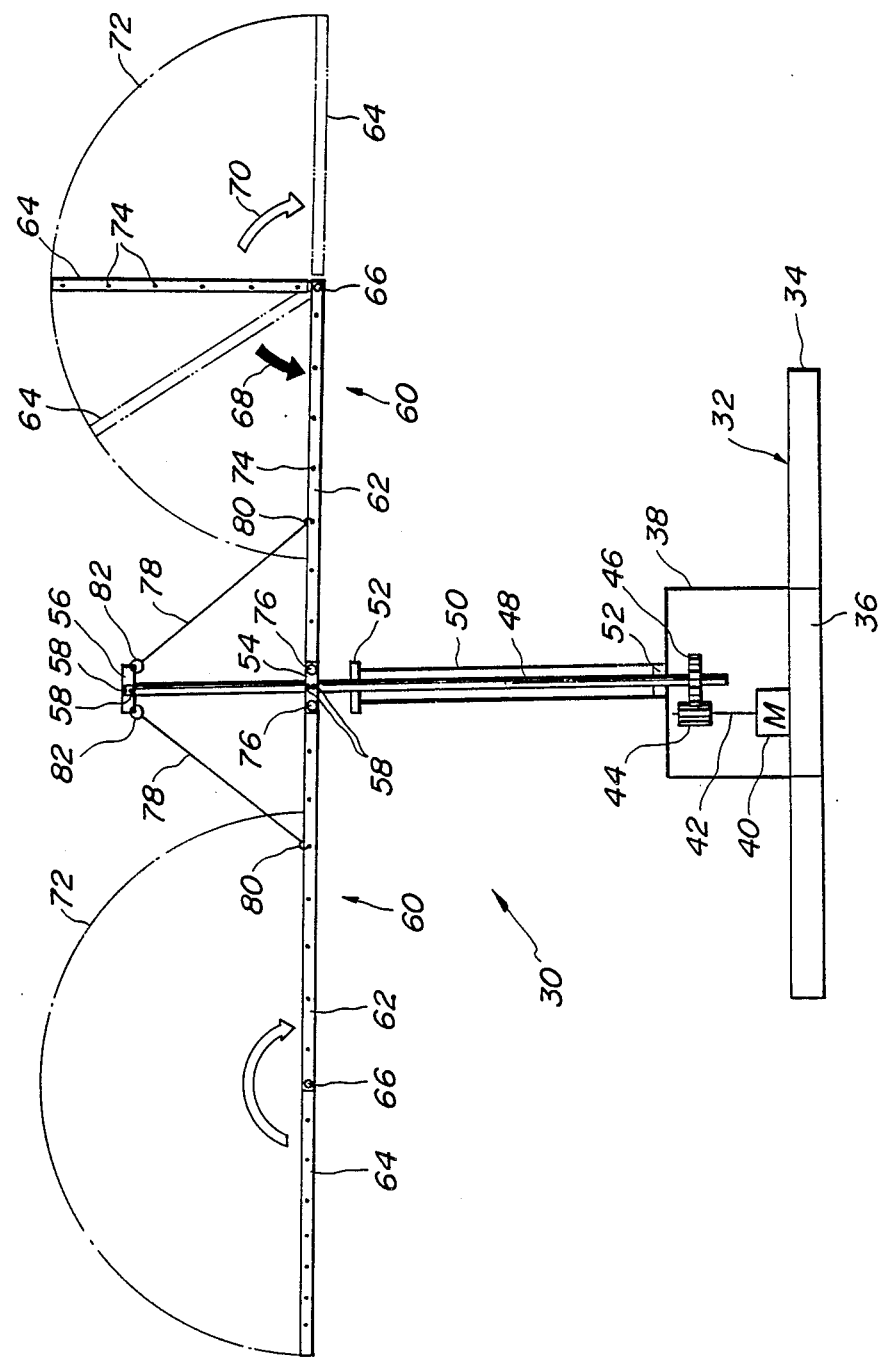

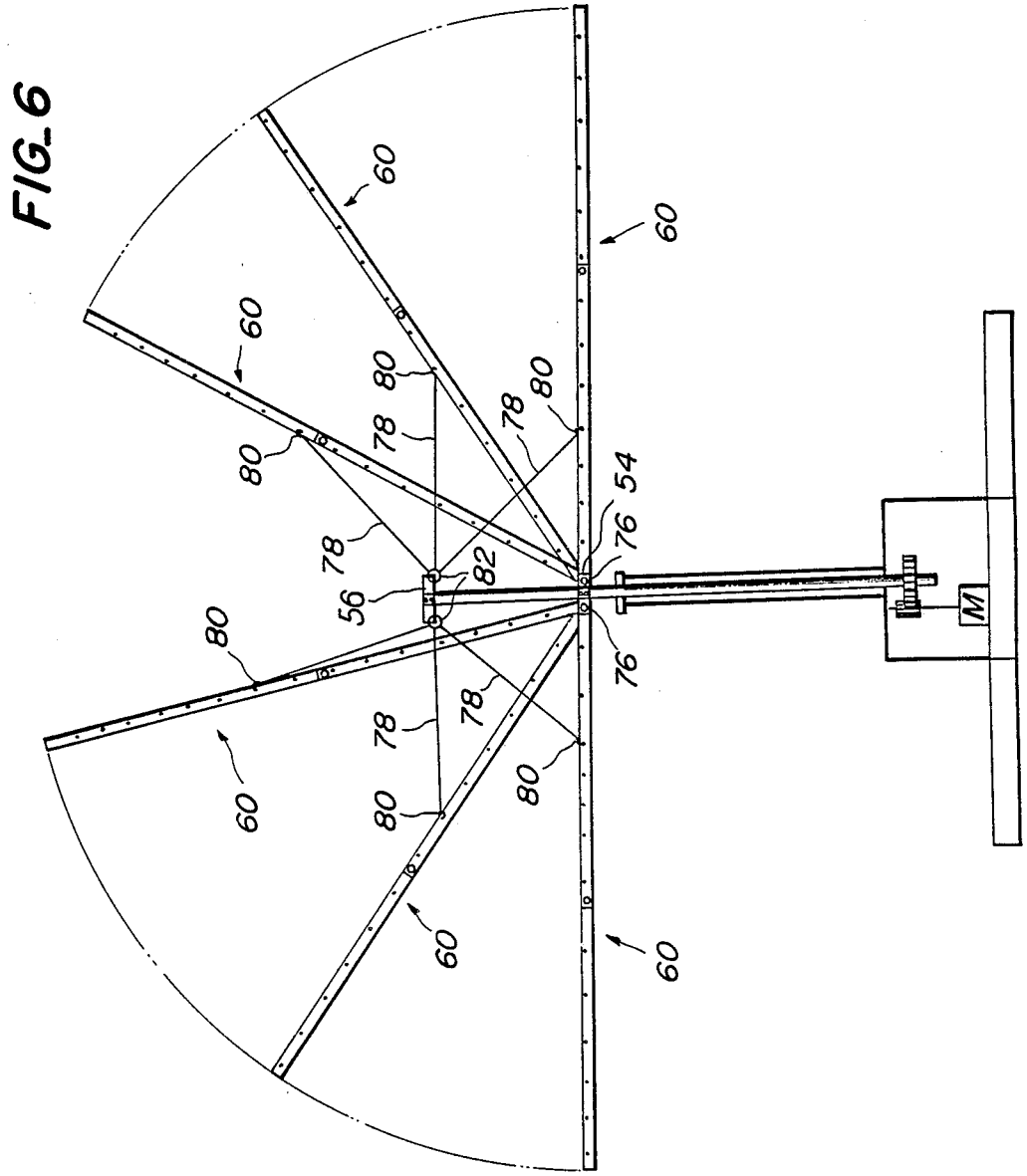

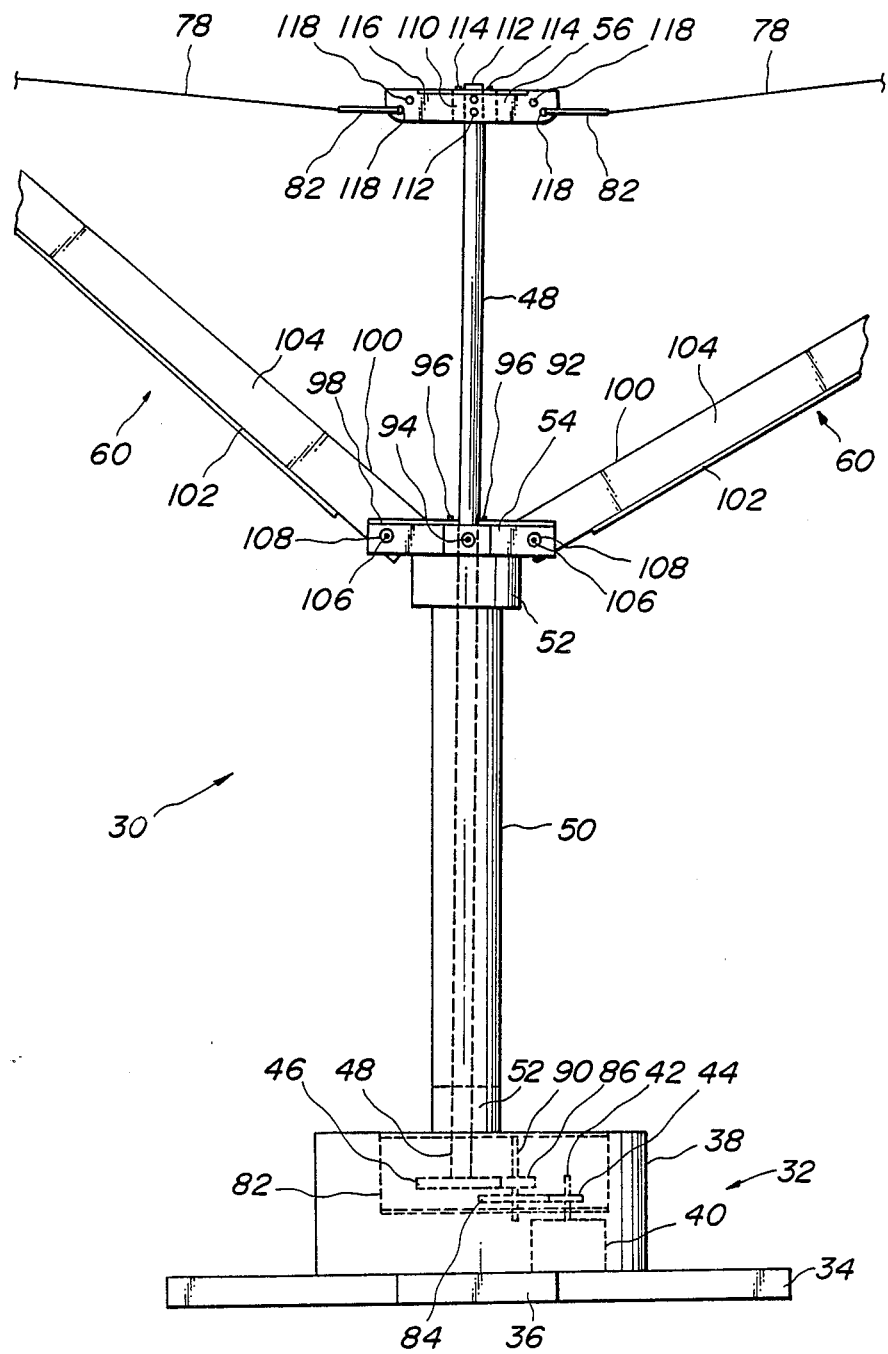

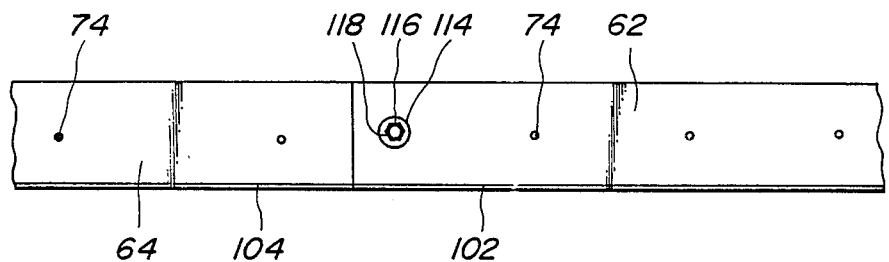
FIG_8
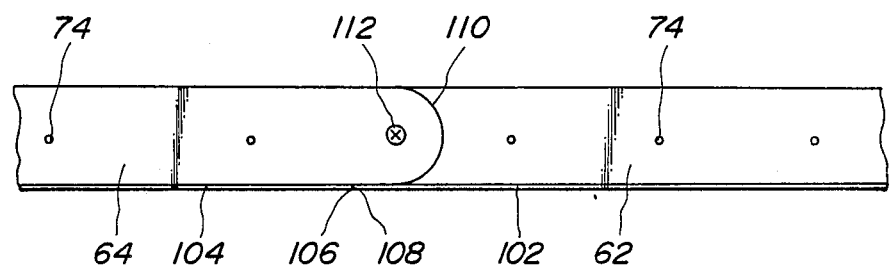
FIG_9

FIG_10
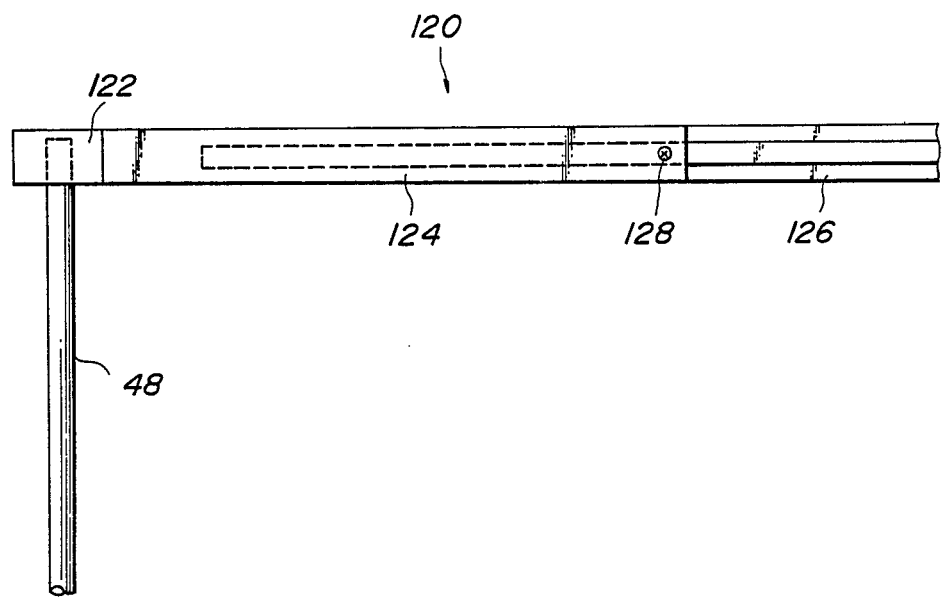
FIG_11
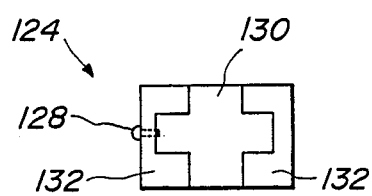
FIG_12
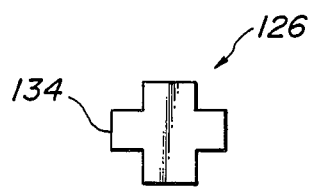

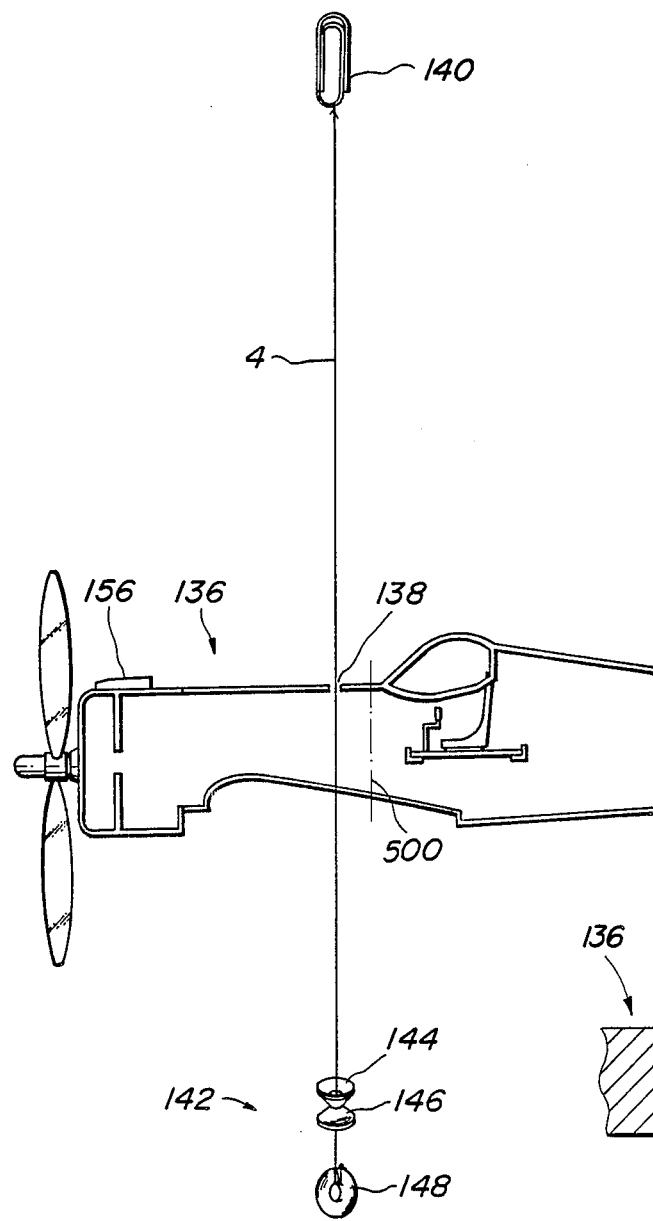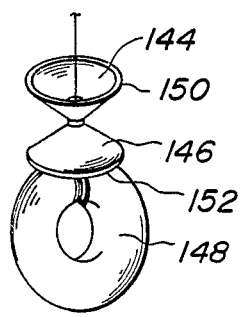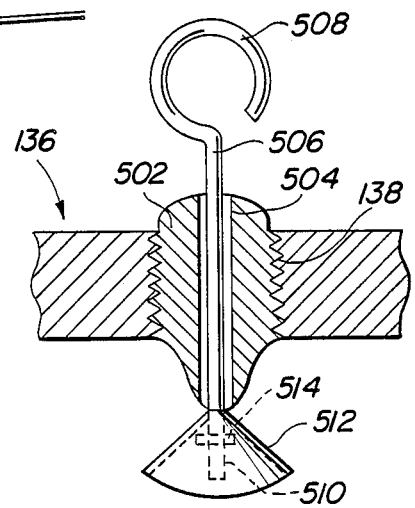

FIG_15
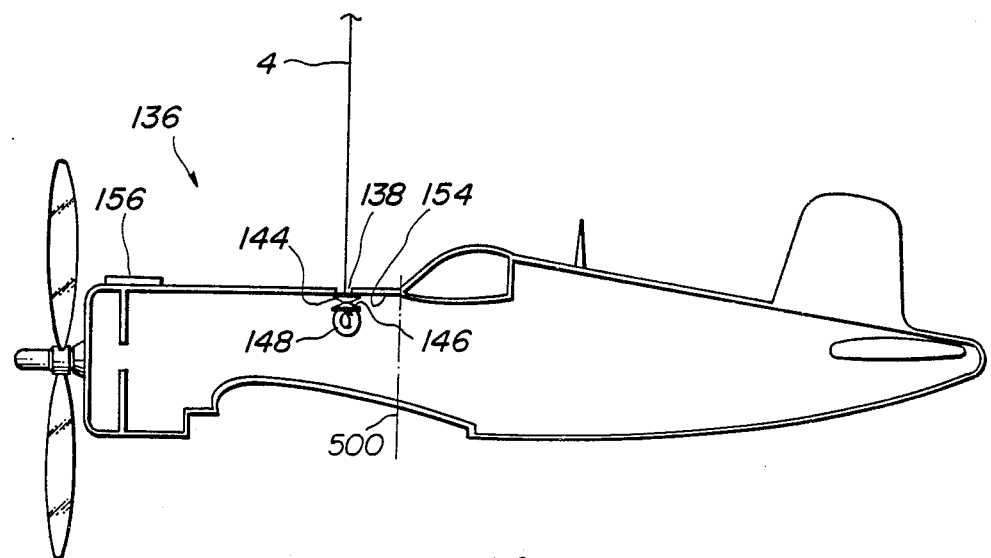
FIG_15A
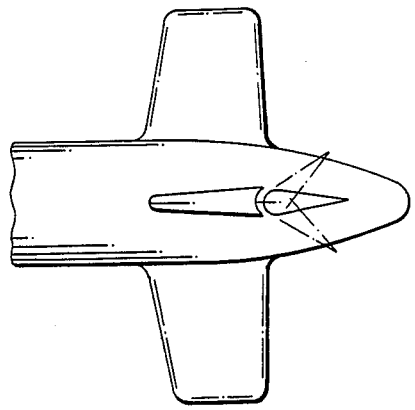

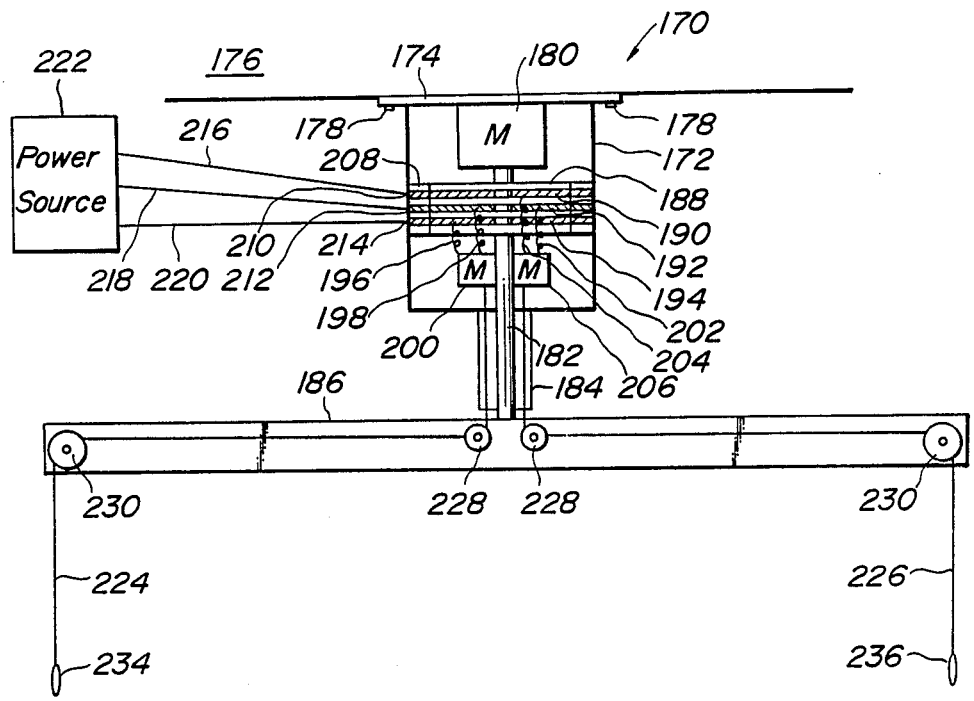
FIG_17
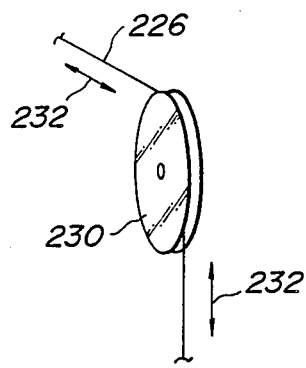
FIG_18

FIG_19
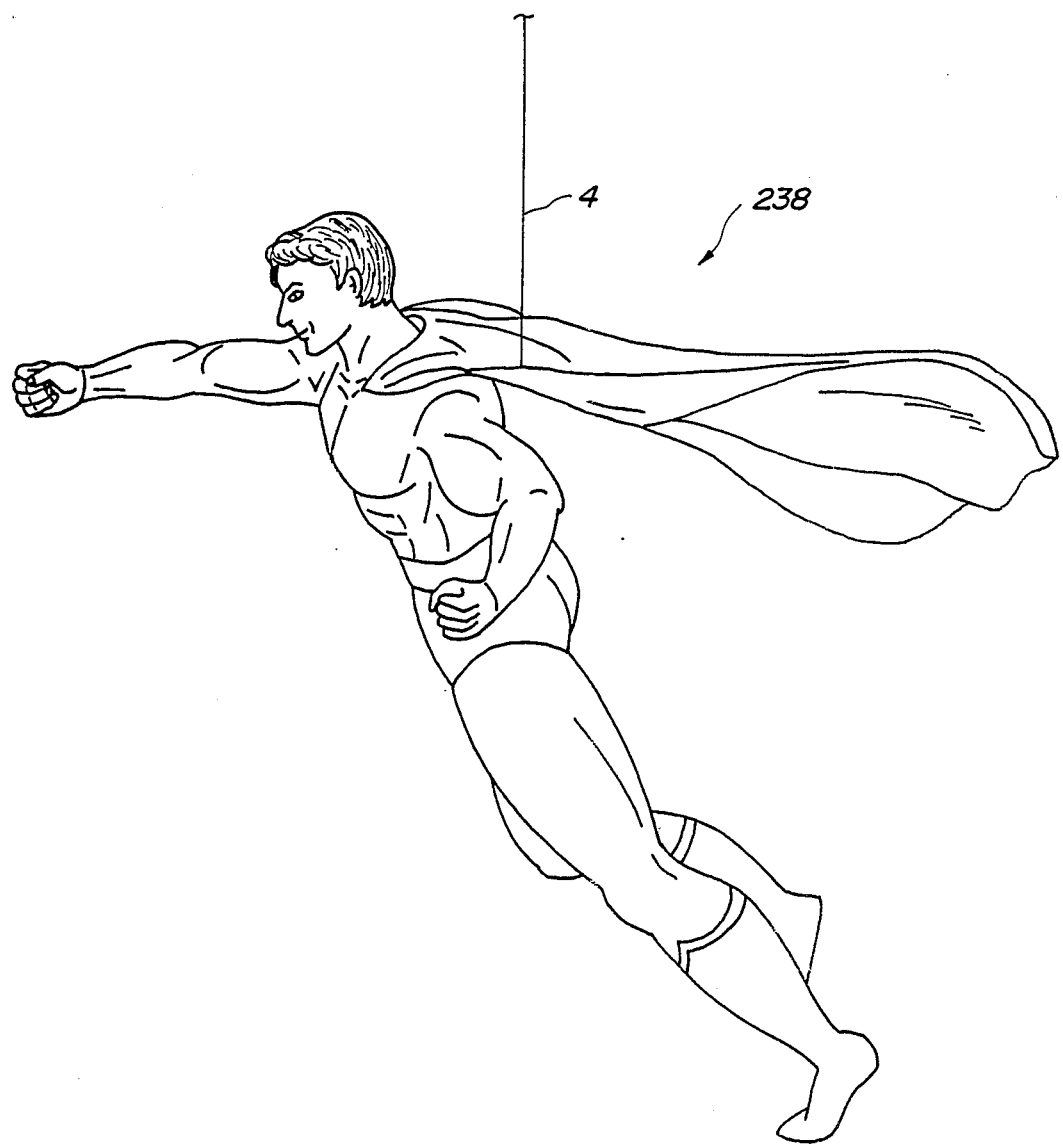

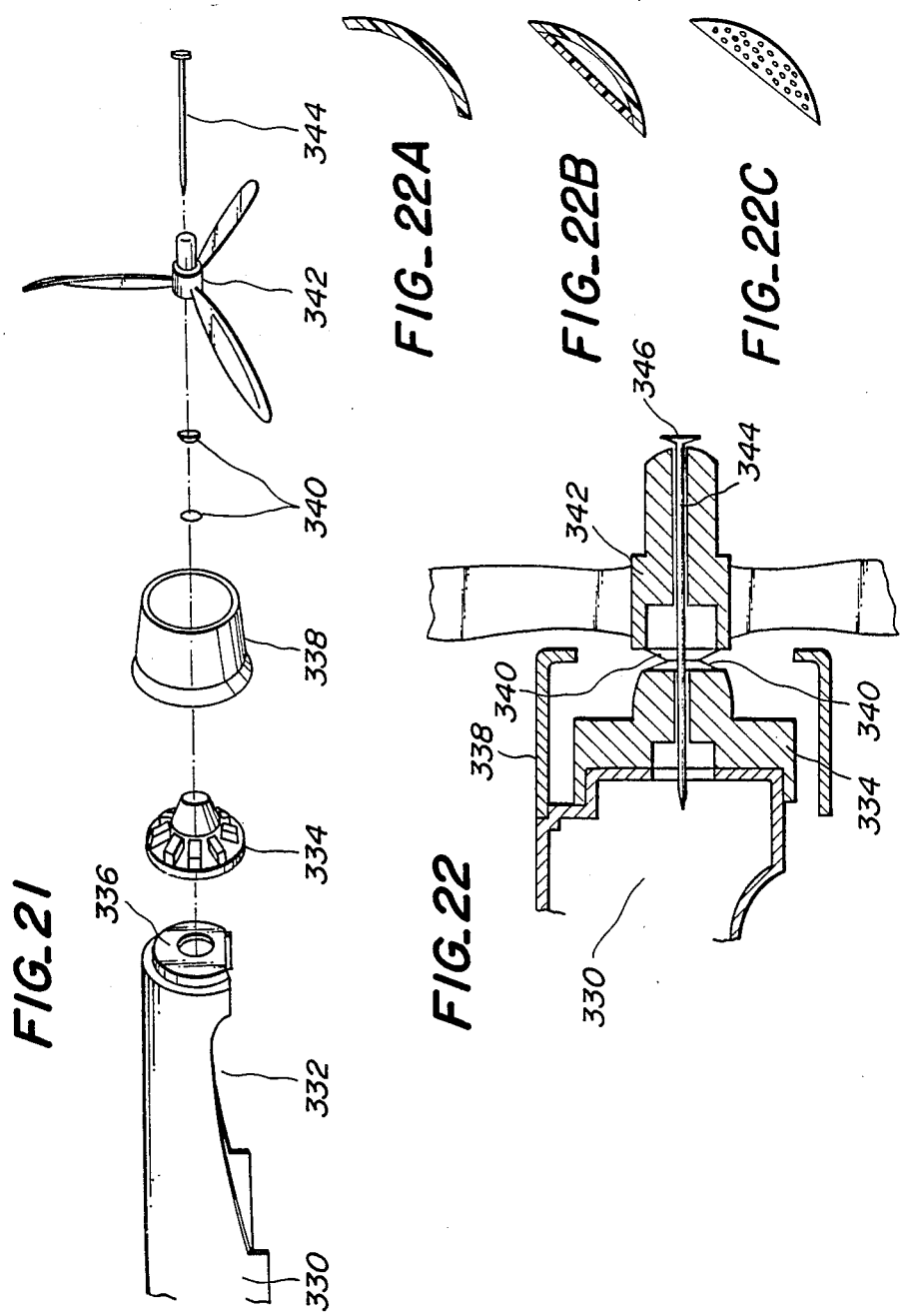

FIG_25
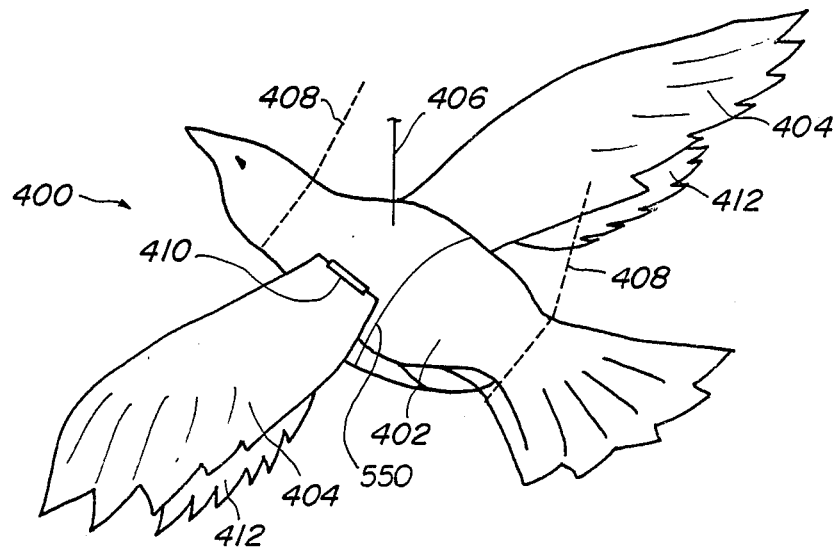
FIG_26
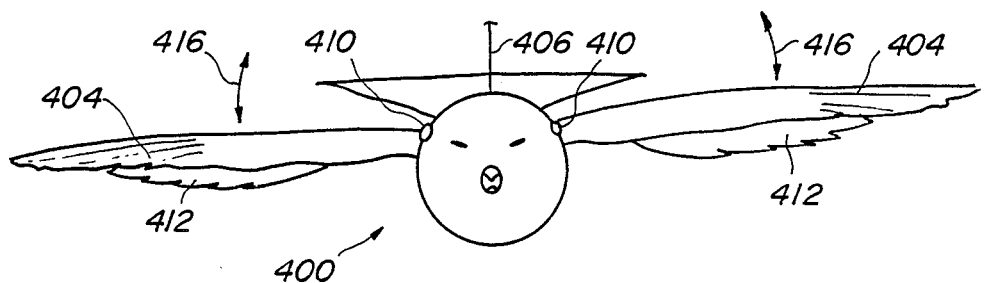
FIG_27
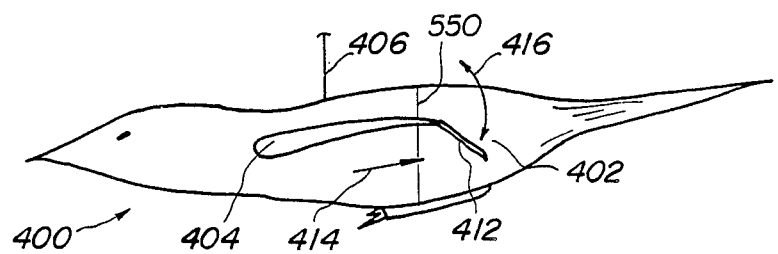

PROPULSION APPARATUS FOR A MODEL OF A FLYING OBJECT

This application is a continuation-in-part of application Ser. No. 743,156, which was filed June 10, 1985, now abandoned.

BACKGROUND OF THE INVENTION

Synthetic resin models of flying objects, such as military airplanes, passenger airplanes, transport airplanes, helicopters, spaceships, flying animals, such as birds, and the like, are known. These models are provided in kit form on a scale proportional to actual size flying objects. Aeromaniacs, ranging from children to grown-ups, love to assemble and manufacture all kinds of models of flying objects.

Some models of planes resemble an actual plane in their dimensions and require a high degree of precision for assembly. They do not, however, include a source of power for flying. Therefore, there is no way to demonstrate the use of the finished model in a flying condition. The hobby of model building is thereby limited to exclude the flying of the model when a hobby enthusiast finishes the model. For this reason, the only function of a powerless, passive model of a flying object, after assembly, is for the visual pleasure of its assembler, be it on a desk or suspended from the ceiling.

The present invention advantageously solves a problem associated with models of flying objects by providing a device for displaying a model of a flying object in a flying condition. By the use of an external power source, the present invention of displays a powerless model of a flying object in a flying condition.

SUMMARY OF THE INVENTION

The present invention includes a propulsion apparatus for displaying a model of a flying object in a flying condition. A flexible hanging line is coupled at one end to a model of a flying object and is coupled at the other end to a propulsion apparatus having a motor for rotating a shaft to which the model of a flying object is connected.

The flexible hanging line, of a predetermined length approximately two times the length of the model to which it is connected, is coupled to the model of the flying object. The hanging line receives external force from an arm-shaped or disc-shaped rotating body driven by a motor The model of the flying object is circularly moved at a certain revolving radius, which is changed according to the desired flight path of the model. The motor causes the model of the flying object to fly in the direction of least air resistance; that is, the model flies due to the external force applied by the motor through the rotary body and a flexible hanging line. The model receives lift, thrust, and resistance inherent to the shape, structure, and the like of the model.

In a model of a flying object having aerodynamic properties, such as an airplane or a jet, the flow of air along the lower surface of the wing arrives at the trailing edge of the wing before the flow of air along the upper surface. The lower surface flow attempts to expand around the trailing edge. As a result, a vortex is formed. The rotation of the flying object accelerates the upper surface flow so that the length of time required for a particle of air to move from the leading edge to the trailing edge becomes the same for the upper and the lower surface flow. Increased velocity of the upper surface flow eliminates the formation of a vortex by the lower surface air at the trailing edge and produces a lower pressure at each point on the upper surface than exists at the corresponding points on the lower surface. The difference in pressures produces a lift on the model.

The flying orientation of the model object is obtained as in a real flying object, by the location of the wings on the fuselage. The lesser wind resistance of the fuselage ahead of the wings compared to the wind resistance of the portion of the fuselage behind the wings orients the front of the model object to fly into the wind. As the front of the fuselage is directed in the direction of rotation or into the wind, the air forces act on the air foil wings to lift the model of the flying object into a condition of flying. The orienting of the model due to its aerodynamic properties produces a stable flight, without wobble.

Therefore, the propulsion mechanism of the present invention provides an apparatus for testing the aerodynamic properties of a model having an aerodynamic design. The hobbyist not only obtains the pleasure of assembling a scale model of an actual aircraft, but is also enabled by the present invention to see the model actually fly when subjected to a circular rotation at a speed of approximately 20 RPM. The flight of the model is based on the same principles which cause full-size aircraft to fly.

The lift on the model caused by its airfoil design elevates the model to a position above the point at which it would be centrifugally located without an aerodynamic design. With respect to models of flying objects lacking an airfoil to cause its elevation by air flow, the centrifugal forces exerted on the model by the propulsion assembly give the appearance of flight.

Therefore, the propulsion mechanism of the present invention provides an apparatus for testing the aerodynamic properties of a model of a flying object through the use of an external power source to cause the model to fly.

BRIEF DESCRIPTION OF THE DRAWINGS

The invention will be explained with reference to the embodiments illustrated in FIGS. 1 through 27, as follows:

FIG. 1 illustrates an embodiment of the present invention where a helicopter, a jet plane, and a propeller plane are suspended from a rotating body mounted on a ceiling.

FIG. 2 illustrates a model of a propeller plane attachable to the hanging lines shown in FIG. 1.

FIG. 3 is a perspective view of an alternate embodiment of the present invention showing a propulsion mechanism to be mounted on the floor or a desk top.

FIG. 4 illustrates an alternate embodiment of the rotary arm shown in FIG. 3.

FIG. 5 illustrates a propulsion mechanism for propelling a model of a flying object through the air.

FIG. 6 illustrates different positions of the rotary arms of the propulsion mechanism shown in FIG. 5.

FIG. 7 illustrates a more detailed view of the propulsion mechanism shown in FIGS. 5 and 6.

FIG. 8 illustrates one side of the central portion of one rotary arm of the propulsion mechanism shown in FIGS. 5 and 6.

FIG. 9 illustrates the opposite side of the central portion of the rotary arm shown in FIG. 8.

FIG. 10 illustrates an alternate embodiment of a rotary arm to be driven by a propulsion mechanism.

FIG. 11 is an end view of the fixed segment of the rotary arm shown in FIG. 10.

FIG. 12 is an end view of the movable segment of the arm shown in FIG. 10.

FIG. 13 illustrates the threading of a coupling for securing a model of a flying object at one end of a hanging line.

FIG. 13A illustrates an alternate embodiment of coupling the model at one end of a hanging line.

FIG. 14 illustrates a detailed view of the couplings used to secure the model of the flying object to the hanging wire shown in FIG. 13.

FIG. 15 illustrates the coupling shown in FIGS. 13 and 14 secured to the model of the flying object.

FIG. 15A illustrates a partial diagrammatic view of an alternate embodiment of a model of flying object having a movable rudder.

FIG. 17 discloses a propulsion mechanism having variable length hanging wires.

FIG. 18 illustrates the mounting of the hanging wire over a pulley shown in FIG. 17.

FIG. 19 illustrates a model of a flying object having a non-aerodynamic design.

FIG. 21 illustrates an exploded view of a forward mounted propeller assembly for a model of a flying object.

FIG. 22 illustrates an assembled view of the propeller assembly shown in FIG. 21.

FIGS. 22A to 22C illustrate cross-sectional view of blade of the propeller according to the present invention.

FIG. 25 illustrates a perspective view of a model of a bird.

FIG. 26 illustrates a front view of a model of a bird.

FIG. 27 illustrates a side view of a model of a bird.

DETAILED DESCRIPTION OF THE PREFERRED EMBODIMENTS

Figure 16:
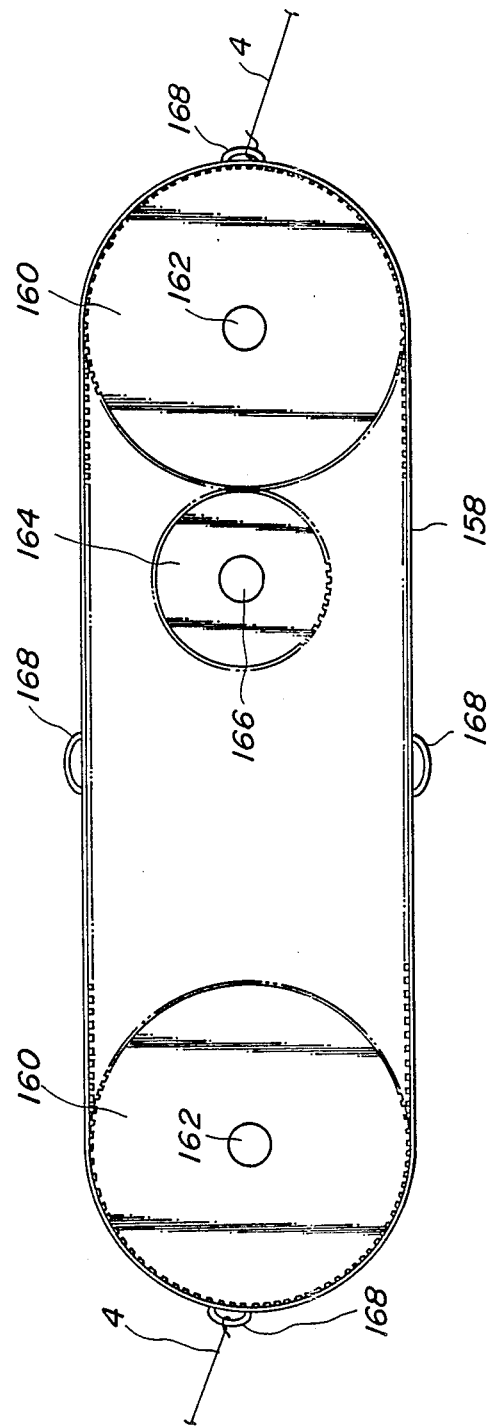
FIG. 16 illustrates an alternate embodiment of a propulsion mechanism for propelling a model of a flying object which is attached to a hanging wire attached to an endless belt.

In FIG. 1, flying models 1, 2, and 3 are coupled to one end of a flexible hanging line 4. Line 4 is a high strength, preferably transparent thin line made of fishing line, thin wire, string, or other suitable material. The other end of each flexible hanging line 4 is coupled to the edge portion of a rotary body 5 at predetermined intervals. Body 5 is disc-shaped.

The flexible hanging line 4 is preferably as thin and transparent as possible to avoid attracting attention to the lines from which the flying models 1, 2, and 3 hang. The flexible hanging line 4 also includes a twist return located as unobtrusively as possible for removing the twist of the hanging wire during rotation of the body 5.

In the embodiment shown in FIG. 1, the rotary body 5 is fixed to an output shaft 14 of a motor 9, secured to a ceiling 8, so as to enable rotation and driving of the rotary body 5 by the motor 9. The motor 9 is an electric motor, preferably of the type that can be changed in rotary speed, if necessary, and can continue rotation of the output shaft 14 by inertia (free-wheeling) when the power supply has stopped.

The coupling of the flexible hanging line 4 to the aerodynamic design flying models 1, 2, and 3 is located on the top of the model, ahead of the center of side surface of each model. The center of side surface is a dividing line for the body of a model which extends around the body of the model in a direction transverse to the forward flying direction of a model, as shown in FIGS. 1, 2, 13, and 15 by line 500. The center of side surface line 500 divides the surface area of a model, where the air hits the model, into equal front and rear air surfaces. The line 500 surrounds the body of the model. The connection point of the hanging line and the model maintains the substantially horizontal orientation of the model during flight. The connection point, when located ahead of the center of side surface, may require counterweights to level the model. This will vary according to the type and weighting of each passive model. The connection at or ahead of the center of side surface prevents spinning of the model when propelled by an external power source. The further forward the connection point is ahead of the center or side surface, the more quickly the model will stabilize. Conversely, the closer the connection point is to the center of side surface, the longer it will take for the model to stabilize during flight.

According to the type of model being flown, the center of gravity of the model can be located anywhere. If the center of gravity is behind the center of side surface, the model will tilt up at its front end. Weights are added to the model at the front end to level the model.

If the models 1, 2, and 3 incline up or down with respect to the horizontal when the models 1, 2, and 3 are coupled to the hanging line 4, a weight, as shown in FIGS. 13 and 15, is secured to lighter portions of the flying models 1, 2, and 3 to place the models in a level flying position. Consequently, the models 1, 2, and 3, coupled by the flexible hanging lines 4 to the propulsion mechanism, are maintained in a flying condition during rotation of the rotary body due to the lift caused by the aerodynamic design of the models, as explained previously.

In models 1, 2, and 3, the center of side surface 500 is generally located around the axis of the fuselage 7, extending perpendicular to the axis of the fuselage.

In other types of models, the center of side surface is located at different points, not necessarily over the wingspan. This is particularly true of models having canard wings, delta-type wings, swept forward wings, or swept rearward wings.

According to the apparatus in FIG. 1, the flying models 1, 2, and 3 are coupled to one end of flexible hanging line 4 by means of a coupling assembly shown in FIGS. 13 through 15. The motor 9 is thereafter rotated at a speed in the range of 20 RPM. Each flying model 1, 2 or 3 receives a centrifugal force through the flexible hanging line 4, in proportion to the motor speed and distance from the center of rotation to move the models in a circular direction through the imaginary line shown in FIG. 1. Each model gradually takes off into a flying condition during rotation.

The time required, from the start of rotation of the motor 9 to the model being in the flying condition for each flying model 1, 2 or 3, depends on the type of model and the speed of rotation of the motor. In general, the flying condition is achieved quicker by using a motor 9 having a higher rotary speed. After each flying model 1, 2 or 3 is in its flying condition, even if the motor rotary speed is considerably slowed down, the flying condition is maintained by each model.

In the flying condition of the models shown in FIG. 1, the centrifugal force acting on each model and the air current around the wings, rudder, and the like can be observed for study, and the hobbyist can enjoy the pleasure of flying a model which was assembled by hand. If the flexible hanging line 4 is very thin and transparent, the flying condition of a model is observed without the appearance of the model being anchored to the propulsion mechanism. The hanging line may be fish line or thin wire.

The models 1, 2 and 3, after operating in the flying mode, are brought to a standstill condition by stopping rotation of the motor 9. A motor, whose brake is actuated simultaneously with the stopping of the rotation of the motor 9 would entangle the flexible hanging lines 4 by the force of inertia, causing each of the models 1, 2, or 3 to continue rotating and become entwined. It is, therefore, preferable to select a motor where the flying models 1, 2, and 3 inertially spin and gradually stop at the same time by the free-spinning of the motor after power has been cut off. The mass of the models frictionally reduces the spin of the motor shaft.

FIG. 3 is a perspective view showing another embodiment of the present invention. The support base 1 is mounted on the floor or secured to a desk or other elevated structure. In this embodiment, a motor 9 is secured to the base 11. A rotary shaft 12 is vertically fixed by set screw 20 extending through coupling 18 to engage output shaft 14 of motor 9. The center portion of a rotary arm 13 is fixed to the top of rotated shaft 12 by nut 22.

A flying model, which is not illustrated, is coupled to an end of each flexible hanging lines 4, which are coupled at their other ends to the ends of the rotary arm 13. Located at the end of arm 13 are holes 16. One end of hanging lines 4 is tied through holes 16 to the rotary arm 13. Models having an aerodynamic design secured to the other end of hanging lines 4 are maintained in a flying condition by the rotary movement of arm 13 caused by motor 9. If a model which is secured by hanging line 14 to one end of the arm 13 is heavier than a model secured to the other end of the arm 13, a weight is mounted on the arm 13 and is slid across the arm to compensate for the imbalance.

In FIG. 4, counterbalance weight 24 is shown located on one side of rotary arm 13. The side of the rotary arm having the weight 24 offsets the weight of two models connected to two hanging wires 4 on the other side of the arm 13. Counterbalance weight 24 is slid on arm 13 to equalize the weight distribution on both sides of the arm 13. In the flying condition of the flying object models, the influence of centrifugal force of the weight on one side of rotary arm 13 exerted on the driven shaft 12 is substantially cancelled by the centrifugal force of the weight on the other side of rotary arm 13 so that, during rotation, the driven shaft 12 is rigid.

In FIG. 5, propulsion mechanism 30 is shown. Propulsion assembly 30 includes base 32. Base 32 includes perpendicularly aligned sections 34 and 36. Sections 34 and 36 are secured to a top of a desk or other elevated surface by C-clamps to stabilize the propulsion mechanism during operation. In an alternate form of mounting, the base 32 can be secured to a floor by screws, nails, or bolts penetrating through the base and secured to the floor.

Motor housing 38 covers motor 40. Driveshaft 42 extends vertically from the motor 40, having a pinion 44 located at the end of the driveshaft 42, opposite to the end of the driveshaft connected to the motor 40. Pinion 44 engages driven gear 46 mounted at one end of driven shaft 48. Driven shaft 48 extends vertically through hollow tube 50 and through bearings 52 mounted at each end of hollow tube 50.

In an alternate embodiment, driven shaft 48 includes a series of telescopically mounted sections. Each section is located within a section of a lesser diameter so that the sections are slidable within one another. Set screws extend through the wall of one section and engage the wall of an adjacent section. The set screws are located above the top of hollow tube 50 for ready access. By the loosening and tightening of the set screws, the height of driven shaft 48 is adjusted by the movement of the individual sections with respect to the remainder of the sections.

Secured to driven shaft 48, above the top bearing 52, is crossbar 54. Further vertically along the driven shaft 48 is crossbar 56. Crossbars 54 and 56 are secured to driven shaft 48 by screws 58. Two arms 60 extend from opposite ends of the crossbar 54. Arm 60 extending from the right side of crossbar 54 includes two sections 62 and 64. Section 62 is pivotable with respect to crossbar 54, and section 64 is pivotable with respect to section 62 about respective interconnections 66. Section 64 is shown in phantom being folded towards section 62 in the direction of arrow 68 and is shown in its fully extended position having been moved in the direction of arrow 70. A stop at pivot 66 prevents section 64 from extending beyond a continuous straight line with is section 62. The arc of rotation of section 64 is shown by semi-circle 72. Each rotary arm section 62 and 64 includes several hooking holes 74 spaced along their lengths.

Section 62 is releasably mounted on crossbar 54 about wing nut shaft 76. Section 62 is moved to several different positions by the tightening and loosening of a wing nut on the wing nut shaft 76. The exact positioning of the sections 62 are determined by the position of support lines 78 which are secured at one end by a hook 80 to hooking hole 74 and at the other end by hook 82 secured to crossbar 56. The hooking holes 74 are also used to secure one end of the hanging line to the rotary arm 60. The other end of the hanging line is secured to a model of a flying object.

As shown in FIG. 6, the positioning of each side of rotary arm 60 is independent of one another. Hook 82 is secured to the cross-shaft 56 and the hook 80 is secured to the rotary arm 60 through one of the hooking holes 74. It is to be appreciated that in FIG. 6, only two sides of two rotary arms 60 are represented, one rotary arm being pivotably mounted at each end of crossbar 54. The other rotary arms 60 shown are merely illustrative of some of the different positions at which the rotary arms can be positioned.

In FIG. 7, a more detailed view of the propulsion assembly 30 is illustrated. Drive shaft 42 of motor 40 extends through U-shaped mounting bracket 82. Pinion 44 is drivingly engaged with gear 84, which rotates pinion 86 coaxially mounted on driveshaft 90. Pinion 86 drivingly engages gear 46 which is mounted at the bottom of driven shaft 48. Driven shaft 48 extends through hollow tube 50 and is mounted centrally in bearings 52. Driven shaft 48 extends axially through cylindrical boss 92 which is secured to driven shaft 48 by set screw 94. Crossbar 54, having a T-shaped cross-section, is secured to cylindrical boss 92 by screws 96 which extend through the top of the crossbar 54 into the cylindrical boss 92 in a direction parallel to the driven shaft 48. The top surface 98 of the T-shaped crossbar 54 is aligned perpendicular to the center axis of the driven shaft 48. A semi-circle is cut from the top surface 98 of the crossbar 54 to receive the driven shaft 48. A plan view of the top surface 98 of the crossbar 54 reveals that it is also T-shaped, providing two cut-out areas for the pivoting of rotary arms 60.

Rotary arm 60 is also of a T-shaped cross-section, with the edge of the top surface of the T being shown at 102. A portion of the top surface of arm 60 is cut away near the end of each arm 60. Face 104 of rotary arm 60 contacts the rear face of crossbar 54. The rotary arms 60 are held to the crossbar 54 by wing nuts. In FIG. 7, wing nut shaft 106 is shown mounted within nut 108. Upon turning of the wing nuts to release the lock on each rotary arm 60, rotary arms 60 are movable to a different position until the wing nut is retightened against the face of the rotary arm 60, opposite to face 104. Two screws, not shown, secure crossbar 54 to boss 92. These screws extend through the rear face of the crossbar 54 into the boss 92 in a direction perpendicular to the longitudinal axis of the driven shaft.

Crossbar 56 is of the same construction as crossbar 54. Crossbar 56 is mounted on the opposite side of the driven shaft from crossbar 54. Cylindrical boss 110, shown in phantom, is coaxially mounted on driven shaft 48. A set screw, not shown, extends through the cylindrical boss 110 in a direction perpendicular to the longitudinal axis of the driven shaft 48 to secure the boss to the driven shaft. Two screws 112 secure the crossbar 56 to the boss 110. Also, two screws 114 secure the top surface of the crossbar 56 to cylindrical boss 110.

Trailing edge 116 of the T-shaped top surface of the crossbar 56 is shown. The top surface of the crossbar 56 is aligned opposite to the top surface of crossbar 54. A semi-circular recess in the leading edge of the T-shaped top surface of the crossbar 56 is not shown. The top of the driven shaft projects slightly above the surface of the crossbar 56.

At opposite ends of the crossbar 56 are defined holes 118. Hanging lines 78 are each secured at one end to a rotary arm 60 and at the other end to hook 82, which extends through one of the two holes 118 located at each end of the crossbar 56. Hook 82 is formed from a piece of wire bent into a two- to three-tiered ring, its opposite ends being free. The diameter of hole 118 is greater than the width of the hook 82 so that the hook 82 is easily movable within the hole 118.

In FIGS. 8 and 9, both sections 62 and 64 of rotary arm 60 are shown. Both sections 62 and 64 are T-shaped in cross-section, with the top of the T forming the projecting bottom edge 102. Section 62 has a cross-section in the shape of a T at the end opposite to the end mounted on the crossbar 54. The end of section 64 engaging the end of section 62 shown in FIGS. 8 and 9 is partially cut away so that the end 106 of edge 104 abuts against end 108 of edge 102 of section 62. The side face of the vertical portion of the T-shape of section 64 is cut into a curved edge 110. A screw 112 extends through overlapped ends of sections 62 and 64. The opposite side of the screw 112 is shown in FIG. 8 as including washer 114, nut 116, and screw shaft 118. The screw, washer, and nut assembly are loosely tightened so that section 64 is pivotable with respect to section 62 about screw shaft 118. In the fully extended position of section 64, end 106 of edge 104 abuts against end 108 of edge 102. Hooking holes 74 are shown spaced along the length of each arm section 62 and 64 for receipt of one end of hanging wires 78 and hanging line 4.

In FIGS. 10 through 12, an alternate rotary arm assembly is shown. Rotary arm 120 is shown mounted on crossbar 122 which is secured to driven shaft 48. Rotary arm 120 includes two sections 124 and 126. Section 126 is slidable within section 124 and is held in position by set screw 128 extending through section 124 and engaging section 126.

In FIG. 11, section 124 is shown as defining a channel 130 between two C-shaped sections 132. Extending through one of the C-shaped sections 132 is set screw 128. In FIG. 12, section 126 is shown, which is shaped complementary to channel 130 so that section 126 will slide within channel 130 with sufficient space for the set screw 128 to extend and engage one side 134 of section 126 to secure section 126 within channel 130. By unscrewing of set screw 128 and moving of section 126, the length of rotary arm 120 is changed.

In FIG. 13, a sectional view of a model of a flying object 136 is shown. Hanging line 4 extends through an opening 138 located between the cockpit and engaging cowling of the model 136. The location of opening 138 is forward of the center of side surface line 500 of the model 136. The opening 138 is on top of the fuselage at its highest relative position, slightly forward of the center of side surface.

In FIG. 13, the wing section has been removed so that the hanging line 4 may pass through the hollow body of the model 136. Paper clip 140 is tied to one end of the hanging line 4 for securing the hanging line 4 to a hooking hole 74 of the rotary arms of the propulsion assembly 30. At the other end of the hanging line 4 is a coupling assembly 142. Coupling assembly 142 comprises two conical cymbal members 144 and 146 and member 148. Member 148 is tied to the other end of the hanging line 4. The diameter of the member 148 is greater than the opening of cymbal 146 through which hanging wire 4 passes. Cymbals 144 and 146, as shown in FIG. 14, include a bottom edge 150 and 152.

In FIG. 13A, an alternate embodiment for attachment of the hanging line to the body of the model 136 is shown. Opening 138 is formed in the top surface of model 136. The sides of the opening 138 are threaded. Inserted within the threaded opening 138 is anchor block 502, which includes corresponding mating threads fitting within the threads of opening 138. Anchor block 502 includes a central opening 504 extending axially through block 502. Inserted through shaft 504 is anchoring pin 506. Pin 506 includes hooked end 508 and straight end 510, shown in dotted lines. A conical cymbal member 512 is secured to end 510 of pin 506 by nut 514.

Hanging line 4 is attached to hooked end 508. The central portion of pin 506 extends through shaft 504.

Cymbal 512 anchors the pin at the top of the model and provides free turning of the hanging line to prevent the line from twisting.

As shown in FIG. 15, when the hanging line 4 is drawn taut, cymbal 144 is pressed against the inner side 154 of the model 136 and surrounds the opening 138. The top edge of cymbal 146 is pulled into intimate contact with the top edge of cymbal 144. When the model 136 is rotated in a circular path, the cymbals 144 and 146 will prevent any twist in the hanging line from being transferred to the model. Cymbal 144 is held against the inner surface 54 of the model 136 and is fixed with respect to cymbal 146 which is movable with hanging line 4. Member 148 presses the top edges of cymbals 144 and 146 together.

Model 136, during rotation by the propulsion mechanism 30, is positioned slightly parallel to the horizontal. To aid in the horizontal positioning of the model, a weight 156 is placed on the exterior of the model 136 in the area of the engine cowling. The weight 156 may be of a thin strip of lead or a segment of modeling clay. The weight 156 may also be located on the interior of the model 136 during assembly for cosmetic reasons.

Of course, if the hanging line 4 has sufficient flexibility, a connecting means threadingly secured to the body of the model 136 with a projecting hooked end may be applicable, namely the looped end of the hanging line 4 is only hooked to the projecting hooked end of the means.

In this connection, the following is important.

When the flying model is hung at the upper surface of the model through a thin and flexible hanging line from the rotating arm end of the propulsion apparatus so as to take flying attitude, such as a horizontal attitude for an airplane model, and is whirled by the propulsion apparatus, the flying model tends to rotate irregularly about the hanging line due to the difference of wind pressure between the front side area and rear side area of the body of the flying model defined by the connecting point of the hanging line to the body with whirling along a circular path which is defined by the lengths of the rotating arm and the hanging line.

If the connecting point of the hanging line to the model coincides with a center of the side area of the body, or the connecting point of the hanging line is arranged extremely near the center of the side surface area, a rotational torque due to the wind pressure applying to the body of the model becomes small because of the difference of wind pressure between the front end rear side surfaces of the body being small. As a result, the model may rotates in a fixed direction or in minimum air resistance direction to the whirling direction of the model, namely in the state that the front end of the model is in forward. But, they are no more than a result of accident.

Also, an irregularly rotating model will be brought into a fixed direction accompanying to increase of turning speed of a propulsion apparatus. This means that the whirling direction of the flying model coincides with the tangential direction of the rotating circular path of the model about the center of the propulsion apparatus. This nature is designated as a stability of the model hereafter. The wind stability is easily obtained by securing the flying model a forwardmost position so that the center of the side surface of the body divides the side surfaces of the body into the front and rear side surfaces which are equal to each other.

However, if the flying model is hung at extreme forward position, a heavy counterweight is required so as to balance the body of model horizontally, and subsequently it rises a problem that the hanging line may be cut because the counterweight becomes heavier beyond the allowable tensile strength of the hanging line. Thus, it is preferable that the counterweight is placed as forward position of the body as possible so that the moment about the horizontal axis perpendicular to the longitudinal axis of the body is increased and then the counterweight is minimized.

Relatively speaking, when the counterweight is heavier, the hanging point should be forwarded so as to balance the body and then the wind stability is increased. On the contrary, when the counterweight is lighter, the hanging point should be receded so as to balance the body and then the wind stability is decreased. Hereupon, increase of the wind stability means that number of whirling where the flying model is in the wind stability condition may be less.

In addition, the thinner hanging line does not attract attention and gives an actual flight appearance, therefore the increase of the counterweight should be avoided. In this case, the wind stability will be decreased as the result of the hanging line being shifted rearward due to the decrease of the counterweight, but the flying model may take the wind stability condition rapidly through an operator pushing the model in the direction of the wind stability. So, the unreasonable increase of the counterweight owing to the increase of the wind stability may be avoided.

Also, a rudder included in a flying model is applicable to solve the foregoing problems, namely to get a wind stability without increasing the counterweight.

In a large airplane model, a rudder is always movably connected to a vertical stabilizer thereof, on the other hand, in a smaller airplane model, a rudder is formed integrally with a vertical stabilizer beforehand.

In the present invention, the rudder of the airplane model is always formed separately from the vertical stabilizer of the model, so that the rudder may be movable in any expected direction and may be fixed thereto. Such as a hinge may be used to achieve that.

When the rudder is fixed at a proper angle to the vertical stabilizer by using known fixing means, and then the flying model is whirled by the propulsion apparatus, the model rotates at some amount corresponding to the angle between the rudder and the vertical stabilizer due to the wind pressure acting on the rudder surface.

Therefore, the movable rudder of the embodiment is useful to obtain the wind stabilizing.

When the rudder of the airplane model is steered to the right or left, there may be a relative large gap between the opposing end portions of the rudder and the vertical stabilizer, and opposing side of the rudder may be seen through the gap. In this case, the gap tends to attract attention, and then it is preferable to form the opposing end portions of the rudder and the vertical stabilizer into a convex and concave, respectively as shown in FIG. 15A, so as not to see the opposing side of the rudder directly.

The foregoing will be explained with a plastic scale model of an airplane having a weight of 24 g as a hole and on a reduced scale of 1/72.

When the rudder of the model is formed integrally with the vertical stabilizer thereof, the counterweight of approximately 9 g in weight should be added at the nose of the model so as to give wind stability to the model, and subsequently total weight of the model including the counterweight is 33 g.

On the contrary, when the rudder of the model is formed movably so as to change the angle between the rudder and the vertical stabilizer of the model and the rudder is adjusted properly relative to the vertical stabilizer, only 4 g counterweight is added. Namely, total weight of the model including the counterweight is 28 g and then the load applying to the hanging line becomes less.

It is found that the steering of the rudder gives wind stability to the model of the airplane and decreases total amount of the counterweight, so that the load to the hanging line is reduced and a relative thin hanging line may be applicable. Therefore the model has the appearance of an actual airplane.

Of course, the steering magnitude of the rudder, namely, the angle between the ruder and the vertical stabilizer should be decided corresponding to the inherent maximum speed of the actual airplane so as to give an actual flight appearance to the model.

If the whirling speed of the model is less, the function of the rudder is not enough, and subsequently the steering magnitude of the rudder is to be increase. On the other hand, when the flying object is, for example, a model of a jet plane, the model is whirled at relative high speed so as to give an actual appearance, the steering magnitude of the rudder should be decrease because, in such a case, the function of the rudder is in excess and wind stability of the model is collapsed.

Therefore, it is essential that the propulsion apparatus is driven at proper revolution in connection with the models.

When the revolutions per minutes of the propulsion apparatus is designated as N, N is given as follows.

$$N = \frac{V \times S \times 100}{2\pi R \times 60}$$

Where R is a radius of the rotary arm, namely the length from the axis of the rotated shaft of the propulsion apparatus to the flying object measured in meter, S is reduced scale of the model, V is a cruising speed per hour in Km of the actual airplane.

If the model is of an actual airplane with cruising speed of 300 Km/hr, and is in reduced scale 1/72 and the rotary arm has 1 m in radius, from the above equation, the revolution N of the propulsion apparatus is $$N = \frac{300 \times 1000}{2\pi \times 1 \times 72 \times 60} \approx 11$$

Thus, an actual flight appearance is given to the model through driving the propulsion apparatus at 11 r.p.m.

If the model is of an actual jet plane with cruising speed of 850 km/hr and is in reduced scale 1/48, the revolution N of the propulsion apparatus to give an actual flight appearance to the model is $$N = \frac{850 \times 1000}{2\pi \times 1 \times 48 \times 60} \approx 31$$

In this connection, the hanging line is required to withstand a centrifugal force due to whirling of the model at those speed. So, the reducing of the counterweight is essential in spite of collapsing the wind stability on the model.

Therefore, the use of adjustable rudder is effective to give a wind stability on a model of an airplane. As previously described, the function of the movable rudder depends on the relative speed of the model to the air, the steering magnitude of the rudder is decreased when the model is whirled at high speed.

In FIG. 16, an alternate propulsion mechanism for propelling a model attached at one end of a hanging line 4 is shown in plan view. An endless belt 158 extends about the periphery of two gears 160, each mounted on a vertical axle 162. One of the gears 160 is driven by a driving pinion 164 mounted on a drive shaft 166 which is driven by a motor or a drive mechanism, as shown in FIG. 7. The teeth of gear 164 engage the teeth of gear 160 to drive gear 160. The teeth of the driver gear 160 engage the teeth of belt 158. The belt 158 drives the other gear 160. Attached to belt 158 are hanging line handles 168, spaced about the periphery of the belt. A hanging line 4 is tied to each hanging line hand 168.

In FIG. 17, a ceiling-mounted propulsion mechanism 170 is shown. The propulsion mechanism includes motor housing 172 attached to mounting plate 174. Mounting plate 174 is secured to ceiling 176 by screws 178. Mounted within motor housing 172 is motor 180. Motor 180 drives driveshaft 182, which extends through the motor housing 172 and tubular member 182. Driveshaft 182 is connected to rotary arm 186. Attached to driveshaft 182 is rotor 188. Rotor 188 includes three electrically conductive strips 190, 192, and 194. Wires 196 and 198 extend from conductive strips 192 and 194, respectively, and are connected to motor 200, which is secured to driveshaft 182. Wires 202 and 204 are electrically connected to conductive strips 192 and 190 at one end, and to motor 206 at the other end. Motor 206 is secured to driveshaft 182. Stator 208 circumferentially surrounds rotor 188 and includes electrical contact brushes 210, 212, and 214, which electrically contact conductive strips 190, 192, and 194, respectively, when driveshaft 182 is rotated by motor 180. Electrical contact brushes 210, 212, and 214 are connected by wires 216, 218, and 220 to power source 222. By controlling the energizing of motors 200 and 206 by the control of power source lead lines 216, 218, and 220, motors 200 and 206 driving take-up reels (not shown) of hanging lines 224, 226, change the length of hanging wires 224 and 226. Hanging wires 224 and 226 each extend over rotatable pulleys 228 and 230.

In FIG. 18, pulley 230 is shown with hanging wire 226 being movable in the direction of arrows 232. The rotor 188, motors 200 and 206, rotating arm 186 and pulleys 228, 230 are all rotatable with driveshaft 182 upon actuation of motor 180. The length of the hanging wires 224 and 226 is altered during rotation of the driveshaft 182 to change the flight path of the model attached at the ends 234, 236 of the hanging wires 224, 226.

Another propulsion mechanism used for the flying of models of flying objects uses a household ceiling fan. A support structure is slipped over the blades of the fan which rotate, at their slowest speed, at approximately 40 RPM. The support structure is connected to one boss of a slip clutch. Connected to the other boss of the slip clutch are rotary arms such as those shown in FIGS. 5, 6, and 10.

Contact pressure between the two clutch bosses and the interposed friction plate is controlled by springs. The spring pressure is controlled by a screw to control the friction on the friction plate by the clutch bosses. The spring pressure is reduced to cause slip between the clutch bosses and to rotate the boss connected to the rotary arms at 20 RPM. Models of flying objects are connected by hanging wires to the rotary arms for flying of the aerodynamically designed models and the appearance of flying of the non-aerodynamically designed models.

The present invention has been explained by reference to the use of models having an aerodynamic design. Models of flying objects, such as futuristic spaceships and "superhero" figures, which are not aerodynamically designed are also usable with the propulsion mechanism of the present invention.

In FIG. 19, a model of a flying object is shown. Model 238 is connected to hanging line 4 and is movable in a circular flight path by the centrifugal force transmitted to the model 238 by a propulsion mechanism. This differs from the flying of the models 1, 2, and 3, shown in FIG. 1, wherein the models are aerodynamically designed in the same manner as the full-sized aircraft upon which they are modeled. Therefore, the models shown in FIG. 1, upon receiving an external centrifugal force, act as an airfoil to develop a resultant force acting upwards, transversely to the direction of flight.

The model shown in FIG. 19 is displayed and appears to fly by the use of the propulsion mechanisms described for the present invention. Although the model 238 does not experience the lift realized for aerodynamically designed models, it will nevertheless appear to fly when transparent hanging lines secure it to a propulsion mechanism.

Figure 20:
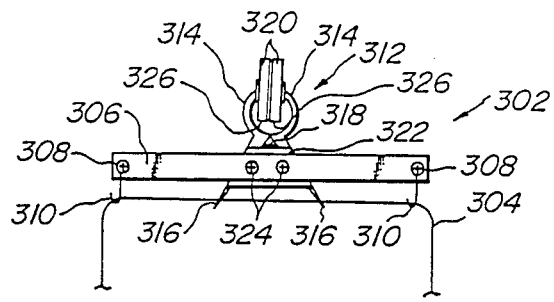
FIG. 20 illustrates a clip-on attachment attachable to the propulsion mechanism shown in FIG. 6.

In FIG. 20, a clip-on assembly 302 is shown for supporting two hanging lines 304 which are secured around the body of two models (not shown).

The clip-on assembly 302 includes aluminum bar 306 with two screws 308. Screws 308 each secure a hook 310 onto the bar 306. Hooks 310 support a hanging line for a model of a flying object. Clip 312 is a large paper-type clamping clip having opposed curved sides 314 extending from the top tip of the clip to handle sections 316, which are located at the bottom of the clip. A spring 318 separates the two sides 314 of the clip and spring biases one side of the clip with respect to the other side of the clip. The clip-on assembly 302 includes two parallel extending slats 320, one slat 320 secured to each curved side 314 of the clip-on assembly 312. The entire clip-on assembly 312 is secured to a mounting plate 322, which is in turn secured to bar 306 by screws 324.

The clip-on assembly 312 is secured to a rotary arm such as the rotary arm 60 shown in FIGS. 6, 7, 8, and 9 for supporting two models of flying objects in a flying condition. The slats 320 clip onto either side of face 104 of rotary arm 60 shown in FIG. 7. The bottom edge 326 of each slat 320 engages projecting bottom edge 102 of the rotary arm. The clip slats are aligned parallel to the rotary arm so that the bar 306 extends perpendicular to the rotary arms. Upon rotation of the propulsion mechanism, the bar 306 is rotated and the models suspended from the hanging lines 304 are also caused to rotate.

Figure 20A:
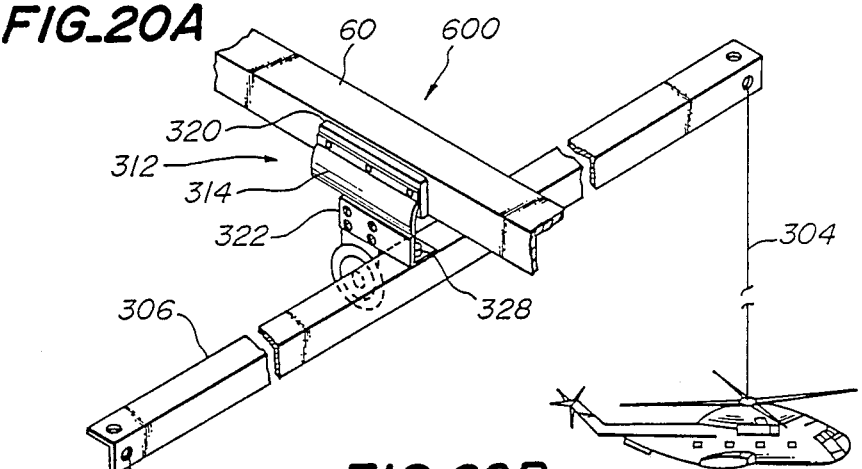
FIG. 20A illustrates an another clip-on assembly attachable to the propulsion mechanism shown in FIG. 6.

In FIG. 20A, another clip-on assembly 600 is shown. This clip-on assembly 600 has a similar constitution except the bar-shaped member 306 being relatively movable against the rotary arm 60 such as shown in FIG. 6. To achieve this, the mounting plate 322 fixed to the handle section of the clip 312 has a protruded portion which is secured to the bar member 306 through a set screw 328. Thus, the angle between the rotary arm 60 and the bar member 306 is changeable as expected by losing the set screw 328. The bar member 306 has, as shown in FIG. 20A, holes at opposite ends thereof for securing the hanging line 304 thereto, respectively. As a matter of fact, it may provide a plural holes to the bar member 306 corresponding to the number of models to be flown by the propulsion apparatus, and also it may use a plural clip-on assembly 600 for a number of hanging lines. Thus, this clip-on assembly 600 is applicable when a plural models are to be flown in formation by the propulsion apparatus.

Figure 20B:
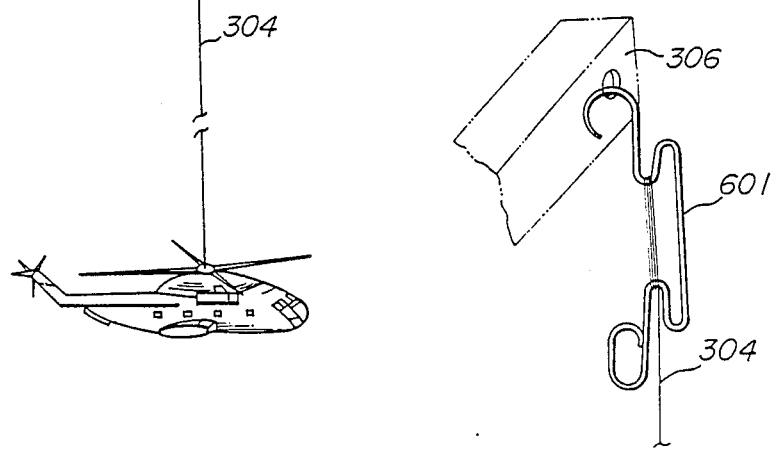
FIG. 20B illustrates a hanging line-take up member applicable to the propulsion mechanism shown in FIG. 6.

In FIG. 20B, hanging line-take up member 601 is hanged on the hole formed at the end of the bar shaped member 306 by hook shaped end thereof. The hanging line-take up member 601 has a short part for taking up the hanging line 304. One end of the hanging line 304 may be secured to an appropriate portion of the member 601. The hanging line 304 may be wound about the short part of the take up member 601 if necessary, so that the length of the hanging line 304, i.e., the flight-attitude of the model is changeable without exchanging the hanging line 304 for another hanging line which is longer or shorter than that of the line 304.

In FIG. 21, the body 330 of a model airplane is shown. Recess 332 defined by the body 330 is shaped complimentary to the wing section of the model plane. An engine section 334 is shown spaced ahead of the engine end 336 of the model body. Engine cowling 338 is shown spaced from the engine section 334. Two conical shaped cymbals 340 are shown located ahead of the engine cowling 338 and before the propeller 342. A shaft 344 is shown located ahead of the propeller 342.

In FIG. 22, the propeller assembly is shown in assembled form. The conical shape cymbal members 340 have a flattened surface at one end. The two flattened surfaces engage one another when the shaft 344 is located through the center of the propeller 342 and engine section 334. The wide end of each conical shaped cymbal 340 is fixed respectively to one of the propeller 342 and the engine section 334 which constitutes a part of the body 330 in assembled state. The shaft 344 is fixed at its one end to the body 330 of the model plane. The propeller 342 is rotatably carried on the shaft 344 and has sufficient play to slide back and forth between the head 346 of the shaft 344 and the cymbal member 340 mounted on the engine section 334.

Of course, two conical cymbal members may be freely arranged on the shaft 344 without fixing respectively to the propeller and the engine section.

During flight of the model as propelled by a propulsion mechanism, the propeller is more readily capable of rotation during flight, even at slow speeds, due to the friction-reducing cymbal members 340 interposed between the propeller 342 and the engine section 334 of the model.

In an airplane with propeller, the cruising velocity is about one-half to one-third comparing to that of a jet plane. So a model of airplane with propeller is to be whirled at relative low speed comparing to a jet plane model so as to give an actual flight appearance, and subsequently wind force acting on the body of the model with propeller is less than that of the jet plane model.

Therefore, it is preferable to use a thin propeller shaft secured to the body of the model at one end thereof so that the propeller rotate about the shaft freely.

In addition to the above, the decrease of propeller weight is essential to make the propeller rotate freely even at low speed.

In prior art synthetic resin models, a propeller including a bossed and blades is solid, so the moment of inertia of the propeller is larger relative to the wind force acting thereto and thus free rotation of the propeller is not expected.

Therefore, in the embodiment shown in FIG. 22A, each blade of the propeller secured to the boss thereof has thin wall and has a substantially arc shape in cross-section so as to reduce the weight of the propeller. Another embodiments shown in FIGS. 22B and 22C, the blade of the propeller is formed in a crescent shape in cross-section which is hollow or which is made of expanded plastic. Also, it is preferable to make the boss of the propeller into hollow to reduce the weight of the propeller, as shown in FIG. 24.

Figure 23:
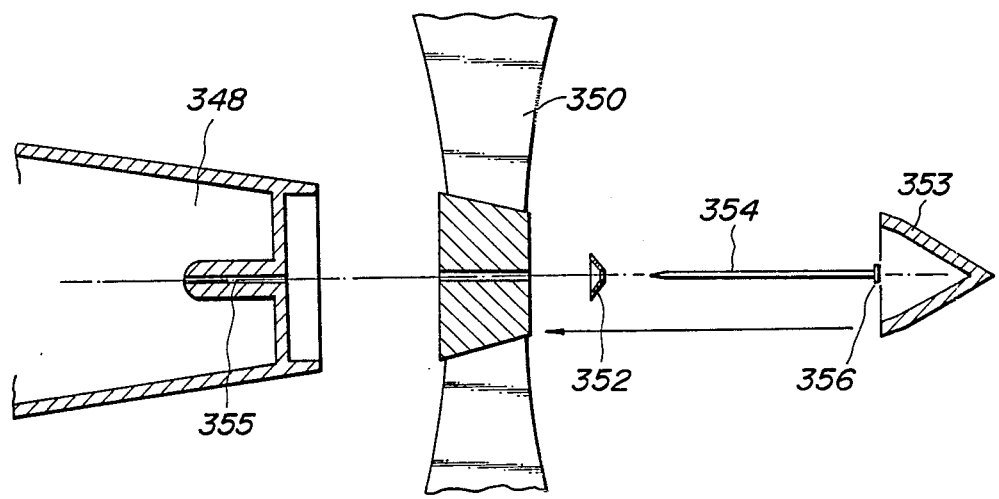
FIG. 23 illustrates a cross-sectional exploded view of a rear-mounted, pusher-type propeller assembly.
Figure 24:
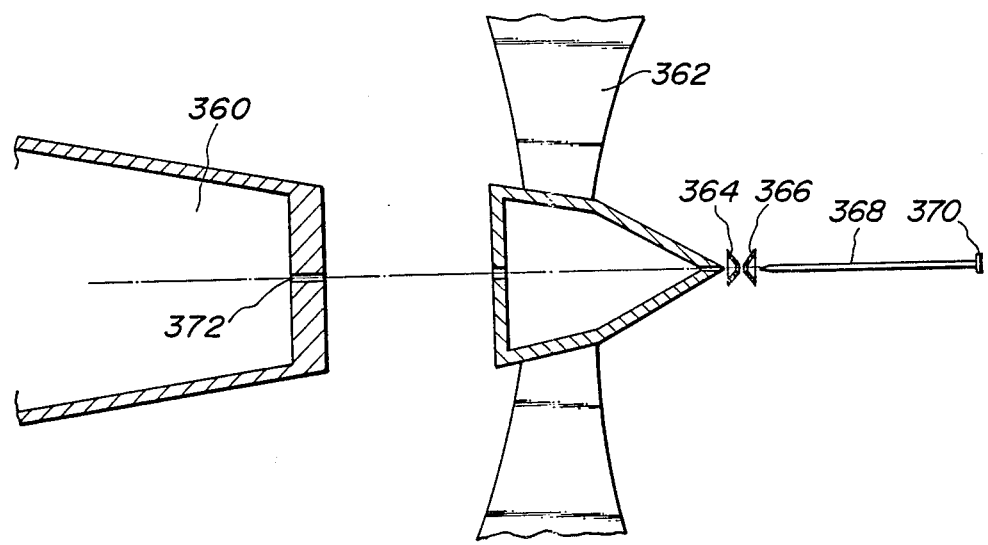
FIG. 24 illustrates an alternate embodiment from FIG. 23 of a cross-sectional exploded view of a rear-mounted, pusher-type propeller assembly.

In FIGS. 23 and 24, a similar propeller arrangement to the propeller in FIGS. 21 and 22 is shown. However, in FIGS. 23 and 24, a pusher type propeller is shown being located at the trailing edge of a wing of a model plane. In FIG. 23, the engine housing 348 is shown with the propeller 350 spaced in front of the engine housing 348. A single conical shaped cymbal member 352 is shown spaced between the propeller 350 and a propeller tip 353. A shaft 354 extends through the center of the propeller 350 and through a channel 355 defined by the engine housing 348. The shaft is fixed in the engine housing 348. The head 356 of the shaft 354 is fixed to the propeller tip 353. The conical member 352 is interposed between the propeller 350 and propeller tip 353. The cymbal member 352 is secured to the propeller 350, the shaft 354 is secured within the passage 355, and the head of the shaft 356 is secured to the propeller tip 353. During flight of the model having the rear-mounted pusher-type propeller shown in FIG. 23, the propeller 350 rotates between the stationary engine housing 348 and the stationary propeller tip 353. The cymbal member reduces the friction of the propeller on the stationary propeller tip 353 and allows rotation of the propeller at slower speeds of flight than is experienced without the cymbal member.

In FIG. 24, engine housing 360 is shown spaced from a propeller assembly 362. Two conical washer members 364 and 366 are spaced from the propeller assembly 362 and spaced from shaft 368. When assembled, washer 364 is secured to the propeller assembly 362, and washer 366 is secured to the head 370 of the shaft 368. The other end of the shaft 368 is fixed within passage 372 defined by the engine housing 360.

During flight of the model including the propeller assembly shown in FIG. 24, washer 364 contacts and spins against washer 366, which is stationary. This aids in reducing friction of the propeller during forward motion of the model having a pusher-type propeller. The spinning of the propeller assembly shown in FIG. 23 or FIG. 24, even at relatively slow speeds, increases the realism of the flight of the flying object by an external propulsion mechanism.

In FIG. 25, a model 400 of a bird is shown. The bird is made of paper with a hollow central body section 402 and wings 404. The hollow body section 402 is filled with weighting material to aid in its stability during flight when powered by the external propulsion mechanism. The bird is suspended from the propulsion mechanism described in the previous Figures by hanging line 406, which is adapted to be suspended from clip-on assembly 302 shown in FIG. 20. The connection of the hanging line 406 to body 402 is the same as for the models described previously. Connection is made at or forward of the center of side surface line 550, at the top of the body.

Each wing 404 is secured to the body 402 of the model 400 by hinge 410. A flap 412 is located at the trailing edge of each wing 404. The hinge 410 is made of masking tape or cellophane tap and is of sufficient elasticity to allow the wings 404 to flap with respect to the body 402 during flight.

In FIGS. 26 and 27, the model 400 is shown with wings 404 being fully extended and the arrow 414 represents the flapping movement of the wings during flight, which is caused by an external propulsion mechanism.

During flight, air passes over the top and bottom surfaces of the wings 404, as described earlier for an airplane wing. This causes the wings, anchored at hinges 410, to be forced upwards into an elevated position above the body by the passage of air. When the wing is at its maximum elevation, as allowed by the flexibility of the hinges 410, the passing air engages the flaps 412. The force of the air engaging flaps 412 and traveling past the flaps forces the wing downward to a position extending laterally from the body 402, as shown in FIG. 26. Continued circular rotation of the model 400 causes the wings 404 to flap as illustrated by arrow 416. The continued upward and downward motion of the wing with respect to the body 402 simulates the flapping motion of a bird in flight. Further, from the details of a live bird shown on the model 400 and with the transparent characteristics of a clear fishing line or thin wire used as a hanging line, the model appears to be a live animal in flight. This is accomplished without the use of an internal motor and is a result of the wind resistance of the model to the wind forces produced by the external propulsion mechanism.

Although the invention as herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

I claim:

1. A propulsion apparatus for a flying object, said propulsion apparatus comprising:
   a base;
   a telescopic shaft extending from said base;
   drive means for rotating said shaft about its longitudinal axis;
   an arm connected to said shaft at a center of said arm;
   a transparent hanging line connected at one end to said arm;
   connecting means for connecting the other end of said hanging line to an upper surface of a body of the flying object; and
   said hanging line being connected to said arm through a clip-on assembly, said clip-on assembly including a clamping clip body, two parallel slats secured to clamping sections of said clip body and engaging with said arm, a mounting plate secured to a handle section of said clip body, a bar-shaped member having holes for said hanging line at opposite ends thereof and rotatably secured to said mounting plate so as to change an angle between said arm and said bar-shaped member.

2. A propulsion apparatus as claimed in claim 1, wherein said arm consists of at least two arm members, each having a plurality of hooking holes at regular intervals in a longitudinal direction thereof, each arm member being pivotably connected at one end to said shaft and extending to make an angle of approximately 180° to each other, and said shaft is provided with a crossbar member having holes at opposite sides thereof, said holes of the crossbar and one of said hooking holes of each arm member being selectively connected through a support line having a predetermined length to stepwise adjust the angle between said arm members and the shaft.

3. A propulsion apparatus as claimed in claim 1, wherein said connecting means includes a block threadingly engaged with said body, said block including an axial opening through which an anchoring pin extends, said pin including a hooked end projecting above said body and an opposite end secured within said body, said opposite end having a cymbal-shaped member for rotatably mounting said pin within said axial opening.

4. A propulsion apparatus as claimed in claim 1, wherein said bar-shaped member is fixedly secured to the mounting plate, and hook means secured to the holes for hooking said hanging line.

5. A propulsion apparatus as claimed in claim 1, wherein said hanging line is connected at one end to said arm through a hanging line-take up member for taking up said hanging line so as to change the length thereof.

6. A propulsion apparatus as claimed in claim 1, wherein said hanging line is connected at one end to said clip-on assembly secured to said arm through a hanging line-take up member for taking up said hanging line so as to change the length thereof.

* * * * *